United States Patent
Yachi et al.

(10) Patent No.: US 6,966,937 B2
(45) Date of Patent: Nov. 22, 2005

(54) PATIENT ISOLATION UNIT

(75) Inventors: Takashi Yachi, Tokyo (JP); Saburo Takagi, Tokyo (JP); Kazuaki Iijima, Tokyo (JP); Takeya Ide, Toyko (JP)

(73) Assignee: Sanki Engineering Co., Ltd., Tokyo (JP)

( * ) Notice: Subject to any disclaimer, the term of this patent is extended or adjusted under 35 U.S.C. 154(b) by 0 days.

(21) Appl. No.: 10/460,261

(22) Filed: Jun. 13, 2003

(65) Prior Publication Data

US 2004/0074212 A1    Apr. 22, 2004

(30) Foreign Application Priority Data

Oct. 22, 2002  (JP) .............................. 2002-307051

(51) Int. Cl.$^7$ ................................................ E04H 1/12
(52) U.S. Cl. ................. 55/385.2; 55/356; 55/DIG. 18; 55/DIG. 29; 55/DIG. 46; 454/158; 454/187; 134/103.2; 134/104.2; 134/201; 96/224; 96/225; 600/21; 128/205.26
(58) Field of Search .................. 55/385.2, 356, 55/DIG. 29, DIG. 18, DIG. 46; 454/158, 454/187; 134/103.2, 104.201; 96/224, 225; 600/21; 128/205.26

(56) References Cited

U.S. PATENT DOCUMENTS

| | | | |
|---|---|---|---|
| 3,601,031 A | * | 8/1971 | Abel et al. .................. 454/187 |
| 3,708,963 A | * | 1/1973 | Boonstra et al. ............... 55/373 |
| 3,774,522 A | * | 11/1973 | Marsh ......................... 454/187 |
| 3,782,265 A | * | 1/1974 | Pielkenrood et al. ....... 454/187 |
| 4,928,581 A | * | 5/1990 | Jacobson ..................... 454/340 |
| 5,152,814 A | * | 10/1992 | Nelson ........................ 96/224 |
| 5,453,049 A | * | 9/1995 | Tillman et al. ............. 454/228 |
| 5,533,305 A | * | 7/1996 | Bielecki ..................... 52/79.1 |
| 5,558,112 A | * | 9/1996 | Strieter .................... 134/103.2 |
| 5,688,297 A | * | 11/1997 | Spengler ...................... 55/356 |
| 6,383,242 B1 | * | 5/2002 | Rogers et al. ............. 55/385.2 |
| 6,833,122 B2 | * | 12/2004 | Reisfeld .................. 422/186.3 |

FOREIGN PATENT DOCUMENTS

| | | |
|---|---|---|
| EP | 0 619 108 | 10/1994 |
| JP | 6-78959 | 3/1994 |
| JP | 7-461 | 1/1995 |
| JP | 7-241318 | 9/1995 |
| JP | 10-151160 | 6/1998 |
| JP | 2001-182977 | 7/2001 |

* cited by examiner

*Primary Examiner*—Duane Smith
*Assistant Examiner*—Minh-Chau T. Pham
(74) *Attorney, Agent, or Firm*—Oblon, Spivak, McClelland, Maier & Neustadt, P.C.

(57) ABSTRACT

A patient isolation unit including a foldable frame body, a flexible envelope made of a flammable resin sheet which can be attached to the assembled frame body, and an exhauster to discharge or exhaust the air from the envelope. The exhauster includes a UV lamp, an HEPA filter, and a blower.

10 Claims, 22 Drawing Sheets

PATIENT ISOLATION UNIT

CROSS-REFERENCE TO RELATED APPLICATIONS

This application is related to and claims priority, under 35 U.S.C. § 119, from Japanese Patent Application No. 2002-307051, filed in the Japanese Patent Office on Oct. 22, 2002, the entire contents of which is hereby incorporated by reference herein.

BACKGROUND OF THE INVENTION

1. Field of the Invention

The present invention relates to a patient isolation unit for temporarily isolating a patient with contagia such as tubercle bacilli for having treatment. More particularly, the present invention relates to an economical patient isolation unit of the kind mentioned which eliminates the need to discard filter means every time an envelope is discarded after completed use of the isolation unit and which can be easily transported and stored in a smaller space.

2. Discussion of Background

In recent years, in-hospital infection caused, for example, by bacilli from tuberculous patients has been a major problem. It is desirable in some cases that patients with such contagia should be temporarily isolated for having treatment.

Under such circumstances, a variety of patient isolation units such as those disclosed in EP 0619108A1 and JP 06-078959A have been suggested.

A patient isolation unit disclosed in EP 0619108A1 has a disposable envelope in which a patient is isolated. Filter means through which air passes has a frame welded to sheet portions surrounding an opening of the envelope so that the filter means needs to be discarded together with the envelope. Furthermore, no specific consideration is given for convenient transportation and storage of the unit.

The isolation unit in EP 0619108A1 involves cost increase since the filter means with a high efficiency particulate air filter (HEPA filter) must be discarded whenever the disposable envelope is disposed or discarded. Furthermore, since the unit needs to be transported in a state of being fully assembled, the unit is hard to handle and requires a larger space for storage.

JP 06-078959A has a foldable frame body from which an envelope is hung. However, no specific consideration is given to convenience in transportation of the frame body in the folded state.

Thus, the unit disclosed in JP 06-078959A may be transported more easily than that disclosed in EP 0619108A1. Nevertheless, the former is still inconvenient in terms of its need to transport the frame body in a state of being lifted up.

The present invention was made in view of the above and has its object to provide a patient isolation unit whose filter means does not need to be discarded every time an envelope is discarded so as to have a longer life and which can be easily transported in the folded state and can be readily stored.

SUMMARY OF THE INVENTION

A patient isolation unit according to the present invention comprises a frame body foldable and/or capable of being disassembled, a flammable flexible envelope adapted to be detachably attached to the frame body as assembled and an exhauster for discharging air from the envelope, the exhauster comprising filter means, sterilizing means for killing germs and bacteria sticking to an inner surface of the exhauster upstream of the filter means and those captured by the filter means and means for discharging the air free from germs and bacteria.

The flexible envelope may have a bottom with or without an opening.

Foldable pillars which constitute the frame body have wheels so as to stand on a floor with the pillars folded.

Germs and bacteria in the air discharged from the envelope are partly captured by the filter means and partly stick to the inner surface of the exhauster upstream of the filter means, and are killed by the sterilizing means. This prevents the germs and bacteria from being discharged to outside from the exhauster. Moreover, the germs and bacteria do not leak out from the envelope since the inside of the bottomed envelope is kept under negative pressure.

These features enable a patient with a contagious disease to be treated in a safe environment and an operator to safely exchange the filter means without being infected.

Since the germs and bacteria sticking to the filter means in the exhauster can be killed by the sterilizing means, the filter means does not need to be discarded every time the spent envelope is incinerated after completed use of the isolation unit. As a result, the filter means lasts for a longer period to be economical.

Furthermore, since the frame body is foldable and/or capable of being disassembled, it can be easily transported and stored in a smaller space and therefore is easy and economical in maintenance.

BRIEF DESCRIPTION OF THE DRAWINGS

FIGS. 27 to 31 are perspective views showing a process of detaching the envelope from the patient isolation unit according to the present invention after completed use of the same in which:

FIG. 27 shows the envelope being not detached yet;

FIG. 28 shows the envelope being partly detached;

FIG. 29 shows the envelope being further detached halfway;

FIG. 30 shows the envelope being detached and flattened except its side on which the discharge duct is installed; and FIG. 31 shows the envelope completely detached from the isolation unit and folded into a round mass;

FIGS. 36 to 47 are views illustrating a process of disassembling the frame body shown in FIG. 32 in which:

FIG. 36 is a perspective view of the frame body at startup of the disassembling;

FIG. 37 is an enlarged side view showing a state in which the pillar in the frame body in FIG. 36 is in the process of being folded;

FIG. 38 is a perspective view showing a state in which the pillars in the frame body in FIG. 36 are folded and an upper beam member is moved to an offcenter position adjacent to two of the pillars;

FIG. 39 is an enlarged side view showing a state in which the pillar shown in FIG. 37 is folded and the folded pillar portions are fixed together;

FIG. 40 is a perspective view showing a state in which the side beam members of the frame body with the pillars folded as shown in FIG. 38 are in the process of being folded;

FIG. 41 is a perspective view of the frame body with the pillars and side beam members being completely folded;

FIG. 42 is a plan view of the frame body shown in FIG. 41;

FIG. 43 is a perspective view showing a state in which the pillars are detached from the beam members of the frame body;

FIG. 44 is a perspective view showing a state in which an intermediate beam member interconnecting the pillars is detached from the pillars;

FIG. 45 is an enlarged fragmentary front view of the folded pillar with a wheel and the beam member being attached;

FIG. 46 is an enlarged fragmentary front view showing a state in which the beam member is detached from the folded pillar shown in FIG. 45; and FIG. 47 is a perspective view showing a state in which the beam members, the pillars and the intermediate beam members interconnecting the pillars are disassembled.

DETAILED DESCRIPTION OF THE PREFERRED EMBODIMENT

An embodiment of the present invention will be described in conjunction with the accompanying drawings.

FIGS. 1 to 31 show an embodiment of a patient isolation unit according to the present invention.

Figure 1:
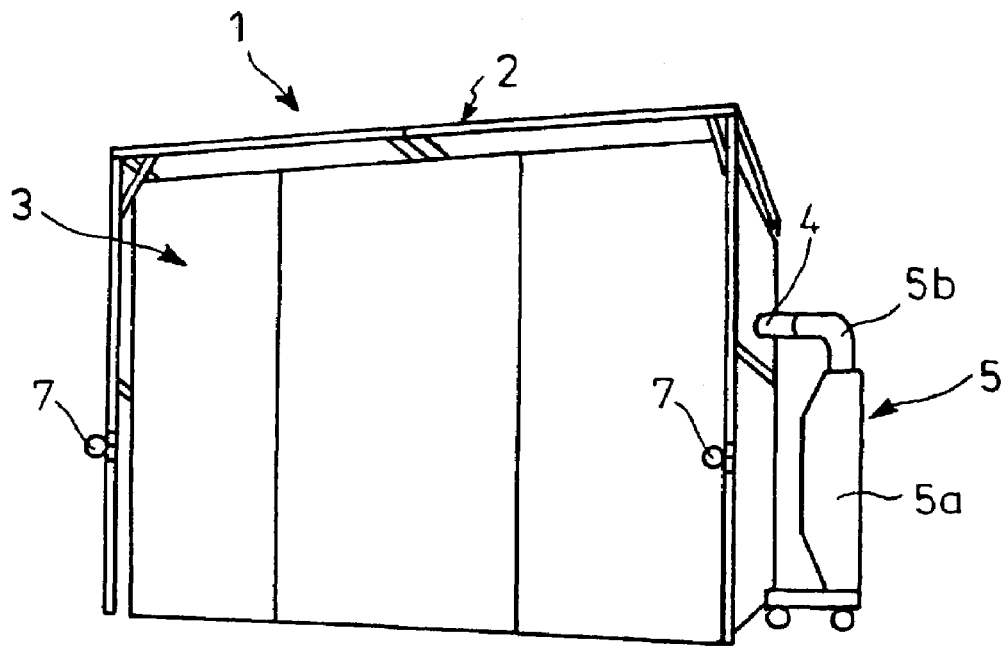
FIG. 1 is a perspective view of an embodiment of a patient isolation unit according to the present invention.

In FIG. 1, a patient isolation unit 1 comprises a frame body 2 assembled, a flexible envelope 3 detachably attached to the frame body 2 and an exhauster 5 connected to the envelope 3 through an exhaust duct 4.

Figure 8:
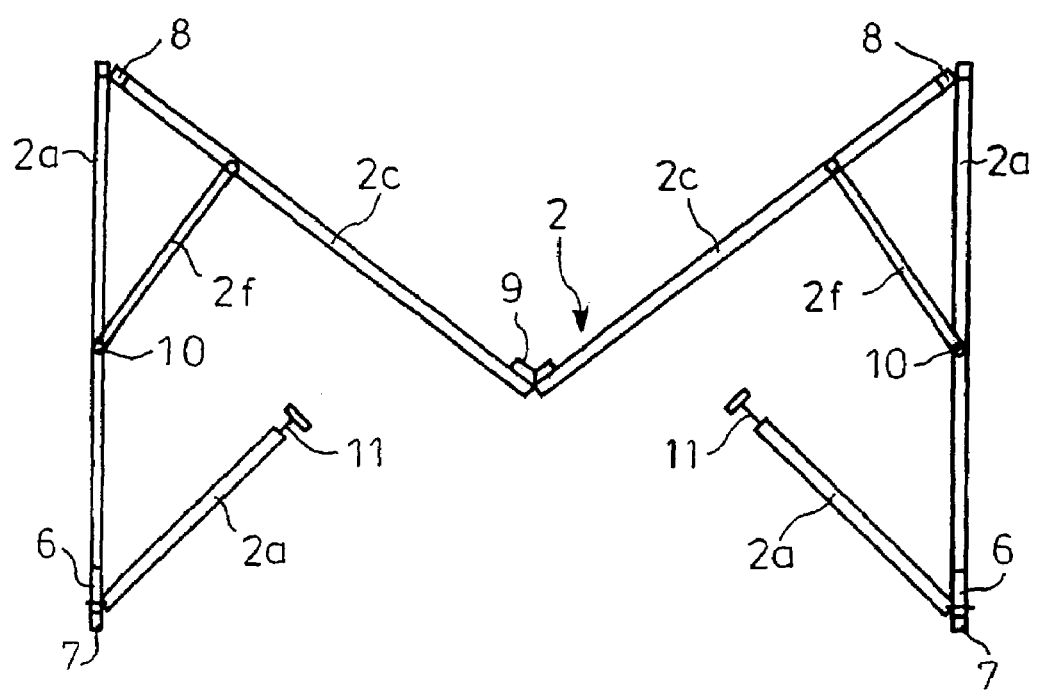
FIG. 8 is a side view showing a state in which the frame body shown in FIG. 4 is in the process of being folded.

The frame body 2 is made of aluminum and is provided with four pillars 2a each constituted by upper and lower pillar portions which are foldably interconnected by a hinge 6 as shown, for example, in FIG. 8. The upper pillar portion is provided, at its lower end, with a caster-type wheel 7. Interconnection of the upper and lower pillar portions by the hinge 6 is supported by fold-preventive means (see FIG. 34) such that the pillar 2a is not unintentionally folded in use of the patient isolation unit 1.

Figure 2:
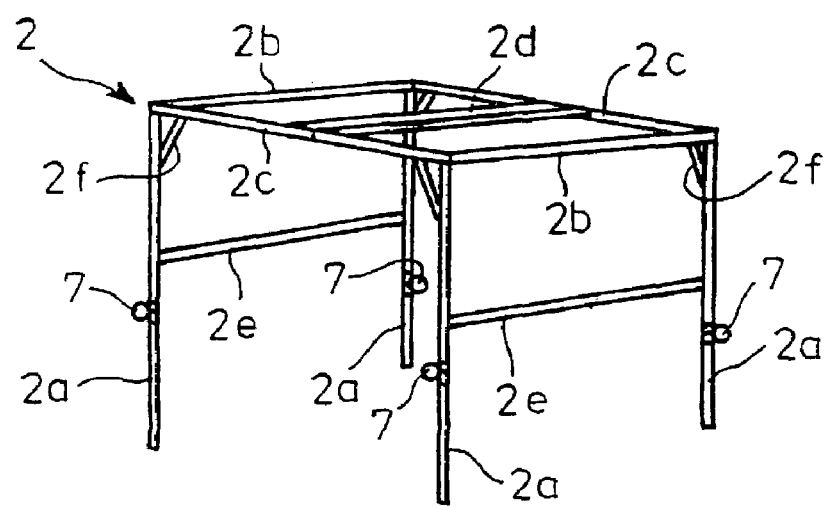
FIG. 2 is a perspective view of a frame body employed in the patient isolation unit shown in FIG. 1 as assembled.
Figure 3:
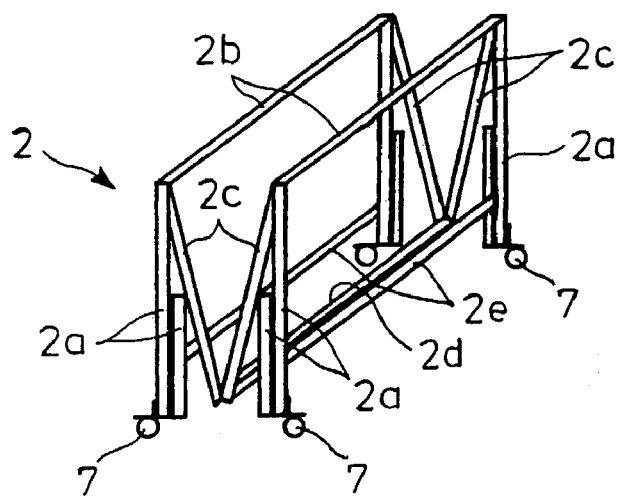
FIG. 3 is a perspective view of the frame body shown in FIG. 2 as folded.

The pillars 2a are connected at their upper ends with lateral and longitudinal beam members 2b and 2c as shown in FIG. 2 such that each of the beam members 2c can be folded down into two as shown in FIGS. 3 and 8. More specifically, the longitudinal beam members 2c each constituted by two halves are interconnected by lateral beam members 2d which are in parallel with the lateral beam members 2b and are hinged together by hinges 9 (see FIG. 6). The beam members 2c are connected at their opposite ends with the upper ends of the pillars 2a through hinges 8 (see FIG. 4).

The pillars 2a are laterally interconnected at their points above their joints, i.e., on their upper portions by lateral beam members 2e (see FIG. 2).

Figure 7:
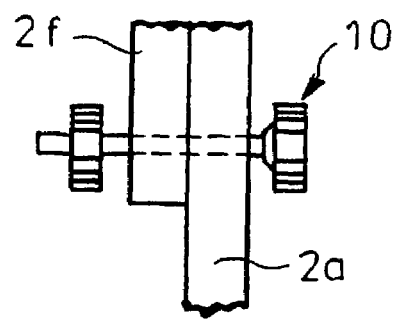
FIG. 7 is a view looking in the direction of arrows VII in FIG. 4.

The beam members 2c are braced by brace members 2f such that an upper end of each brace member 2f is pivotally attached to the beam member 2c adjacent to the upper end of the pillar 2a, a lower end of the brace member 2f being fixed to the pillar 2a by fastening means 10 in the form of a knobbed bolt and nut as shown in FIG. 7.

Height control means 11 may be optionally fitted to each bottom of the lower portions of the pillars 2a.

Figure 9:
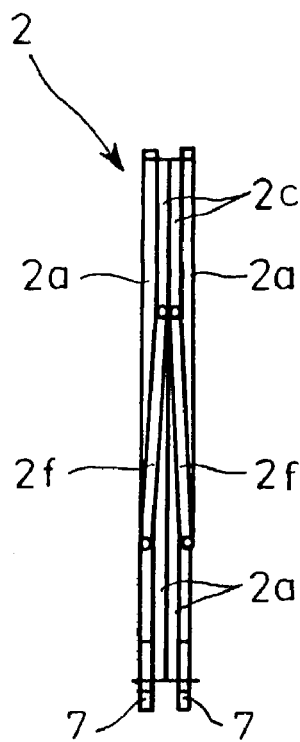
FIG. 9 is a side view showing a state in which the frame body shown in FIG. 4 is folded.

Upon fold-down of the frame body 2, the beam members 2c are folded down into two about the hinges 8 and 9 and the longitudinally opposite pillars 2a are caused to come closer to each other, and connection points of the brace members 2f to the pillars 2a are allowed to slide downwardly on the pillar 2a by loosening the fastening means 10. In this way, the frame body 2 is folded into a compact size as shown in FIGS. 3 and 9.

Figure 10:
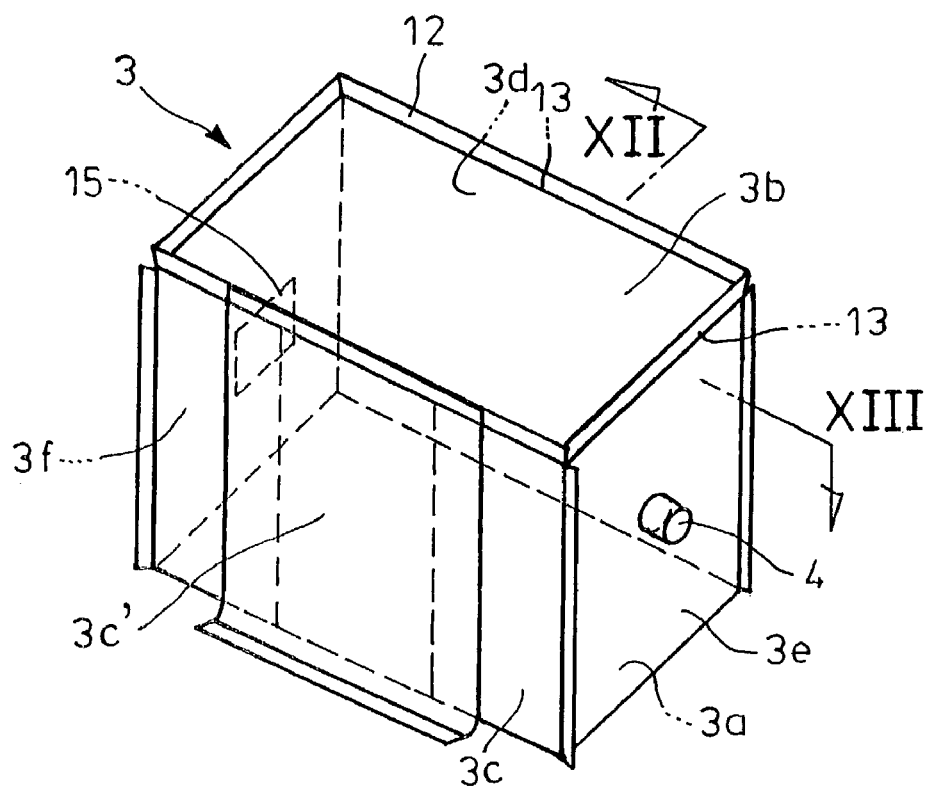
FIG. 10 is a perspective view of a flexible envelope employed in the patient isolation unit shown in FIG. 1.
Figure 11:
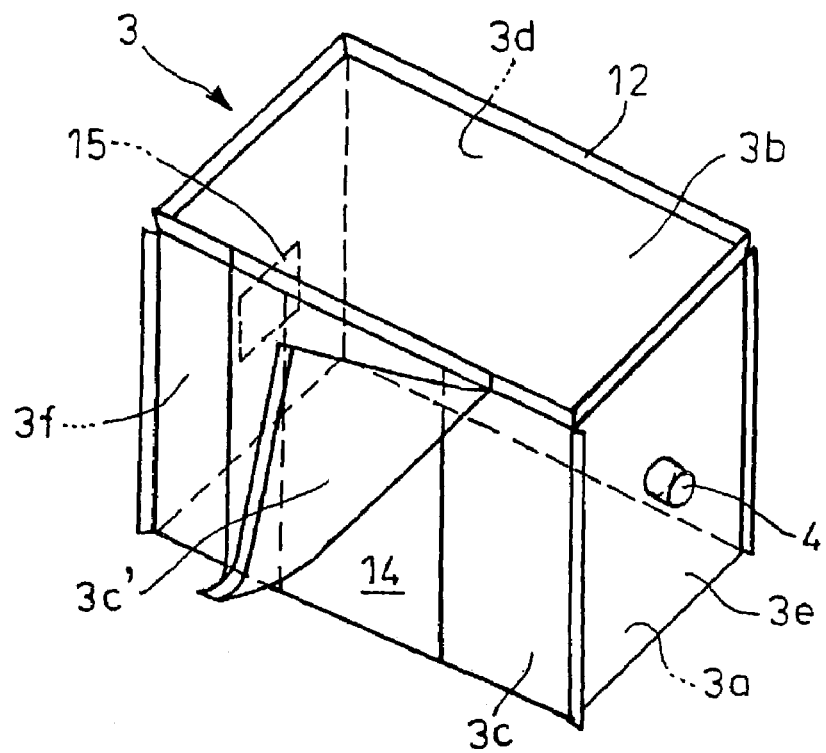
FIG. 11 is a perspective view showing the envelope of FIG. 10 with a curtain being turned up to open.
Figure 12:
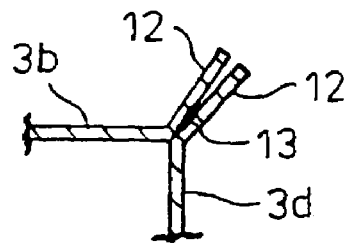
FIG. 12 is a detailed view of fins of the envelope looking in the direction of arrow XII in FIG. 10.
Figure 13:
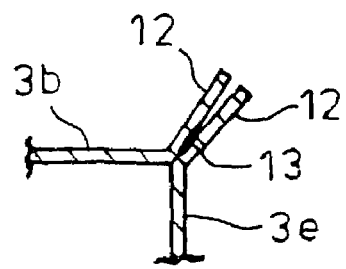
FIG. 13 is a detailed view of the fins of the envelope looking in the direction of arrow XIII in FIG. 10.
Figure 17:
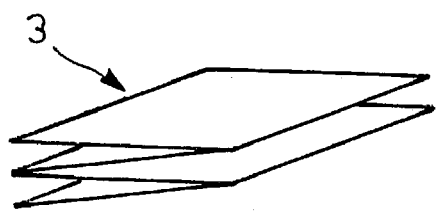
FIG. 17 is a perspective view showing a state in which an unused envelope is folded.

The flexible envelope 3 is made of sheet of flammable resin such as low-density polyethylene and is in the form of a hexahedral tent with a bottom. As shown in FIGS. 10 and 11, the envelope 3 comprises a bottom portion 3a, a top portion 3b, side wall portions 3c and 3d, a front wall portion 3e and a rear wall portion 3f. As shown in FIGS. 12 and 13, each of these portions are formed with fins 12. The fins 12 adjacent to each other between the envelope portions are fused together at 13 over their length so as to prevent the air from leaking outside. The fins 12 serve as components on which below-mentioned supported members 20, 25 or 27 (see FIGS. 20, 22 and 23) are mounted; alternatively, they serve as components formed with openings 12a for engagement with supported members 30 (see FIG. 24). The bottom portion 3a is of a non-slip type. The unused envelope 3 is neatly folded as shown in FIG. 17.

As shown in FIG. 11, the side wall portion 3c has an access port 14 over which an openable curtain 3c' is hung with its upper edge being fused to the fin 12.

Figure 16:
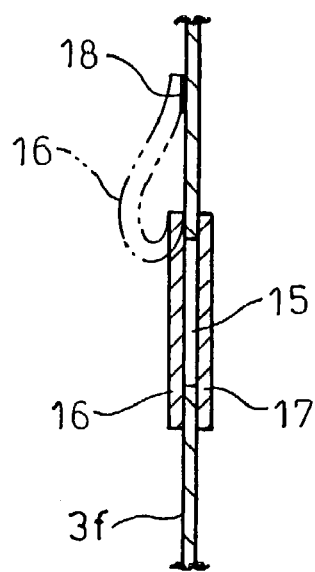
FIG. 16 is an enlarged sectional view of the outer and inner covers of the envelope.

The exhaust duct 4 as mentioned above is provided on the front wall portion 3e of the envelope 3 while an air intake 15 is provided on the rear wall portion 3f as shown in FIG. 16. The air intake 15 is provided with outer and inner covers 16 and 17 positioned on the outer and inner sides of the wall portion 3f, respectively, to conceal the air intake 15. Both of the covers 16 and 17 have their upper edges secured to the wall portion 3f by fusing or by use of adhesive tape.

The outer cover 16 is provided with a single-sided adhesive tape strip 18 to keep its opened state while a double-sided adhesive tape strip 19 is provided along lower and opposite side edges of the air intake 15 on the outer side of the rear wall portion 3f to prevent the closed cover from opening. Thus, the outer cover 16 is opened to introduce air into the envelope 3 when the patient isolation unit 1 is used; the cover 16 is closed to prevent air from flowing into the envelope 3 when the envelope is flattened into a compact size after use.

The inner cover 17 serves as a check valve such that it can introduce air from the air intake 15 into the envelope and can close to prevent the air introduced into the envelope 3 from leaking out through the air intake 15.

The exhaust duct 4 and the outer and inner covers 16 and 17 are all made of flammable resin such as low-density polyethylene just like the envelope 3.

Figure 18:
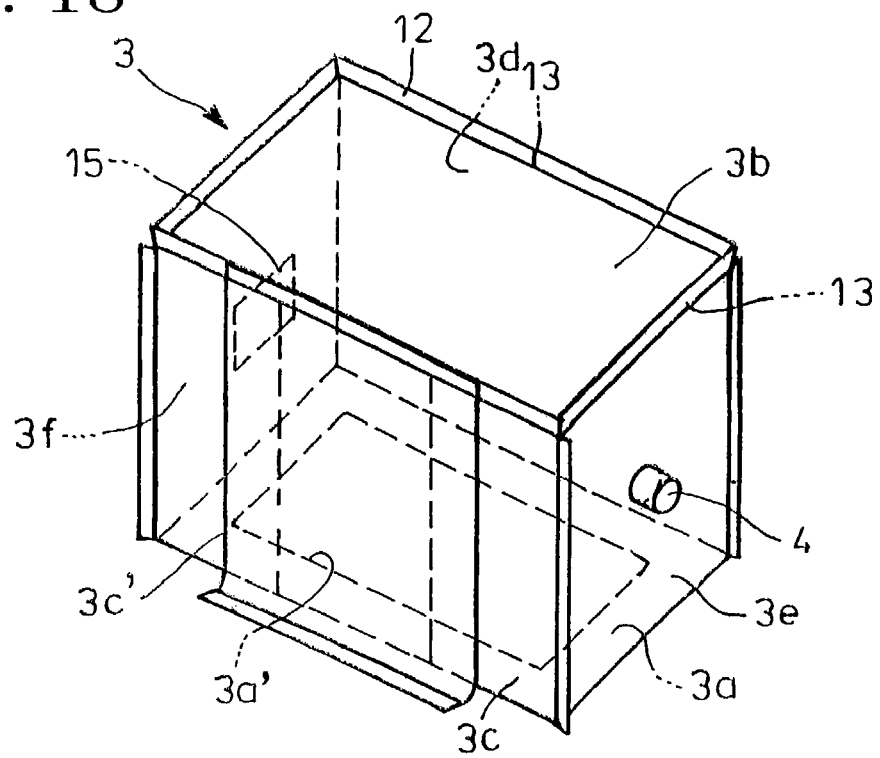
FIG. 18 is a perspective view of a modification of the envelope employed in the patient isolation unit shown in FIG. 1.

The envelope 3 may have an opening 3a' on the bottom portion 3a as shown in FIG. 18. The opening 3a' is used for, for example, bringing in a bed when the bed cannot be brought into the envelope 3 through the access port 14.

Figure 19:
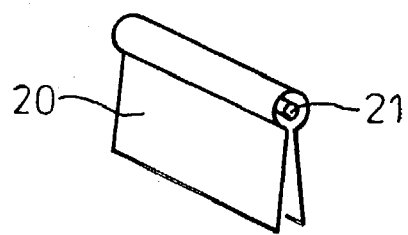
FIG. 19 is a perspective view of supported means which is to be fixed to the fins of the envelope.
Figure 20:
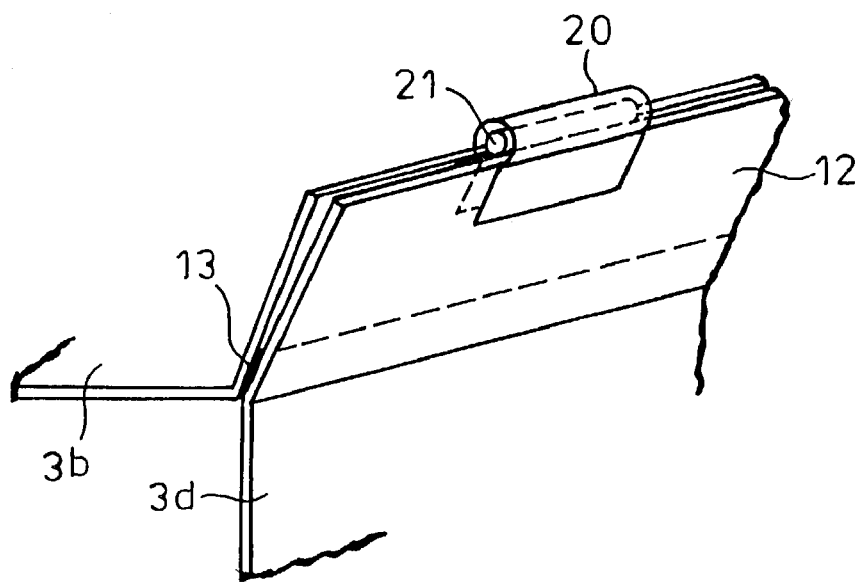
FIG. 20 is a perspective view showing an example of how to attach the supported means shown in FIG. 19 to the fins.

Color-tape like supported members 20 are spaced apart longitudinally of and pinchingly fitted over the fins 12 each formed between the connected portions of the envelope 3 as is shown in FIG. 20. A string member 21 is caught at the portion of the supported member 20 opposing the outer edges of the fins 12. An overall shape of the supported means having the supported member 20 and the string member 21 assembled together is shown in FIG. 19.

Figure 21:
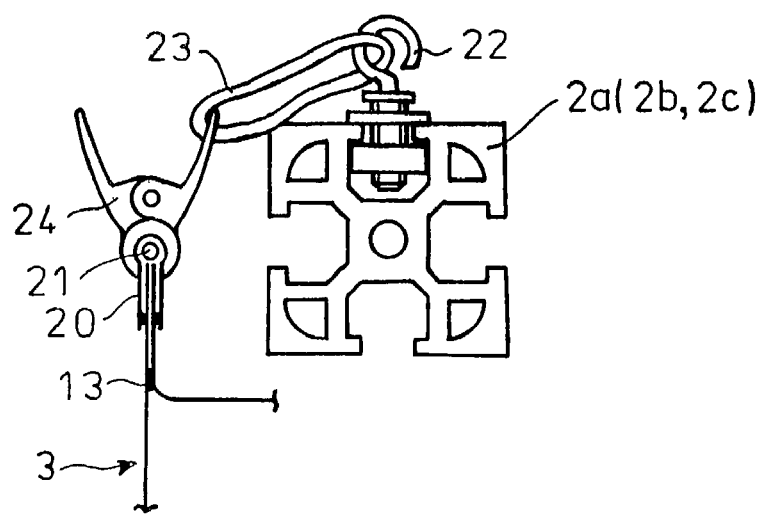
FIG. 21 is a sectional view showing a state in which the envelope is supported via the supported means by the frame body.

As shown in FIG. 21, each of the beam members 2b and 2c and the pillars 2a of the frame body 2 has hooks 22 fitted in and spaced apart longitudinally of the former. Each of the hooks 22 is connected through an endless rubber string 23 with a clothes-pin-shaped clip 24 which pinches the supported member 20 fitted over the fins 12 from opposite sides.

Figure 22:
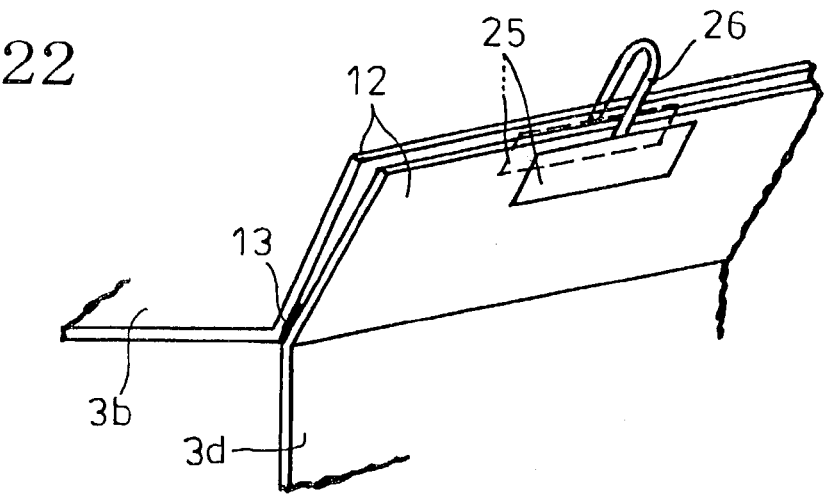
FIG. 22 is a perspective view showing a modification of the supported means attached to the fins.

Alternatively, the supported means attached to the fins 12 may comprise two color-tape like supported sheets 25 interconnected through a string member 26 and fitted over the adjacent fins 12 to pinch the same as shown in FIG. 22.

Figure 23:
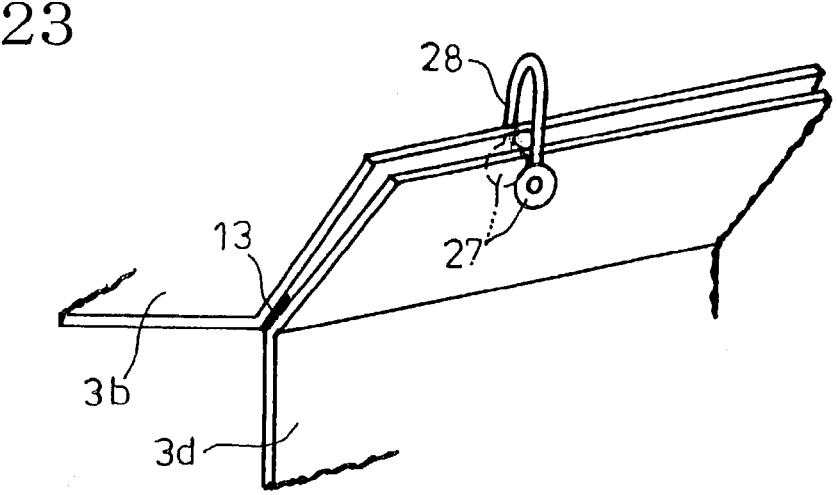
FIG. 23 is a perspective view showing a further modification of the supported means attached to the fins.

Alternatively, as shown in FIG. 23, the supported means may comprise two supported members 27 in the form of snap hooks with a string member 28 and fitted together to pinch the adjacent fins 12. In the case of the supported means shown in FIG. 22 or 23, the envelope 3 can be readily mounted to the frame body 2 by directly hooking the strings 26 or 28 on the hooks 22 as shown in FIG. 21.

Figure 24:
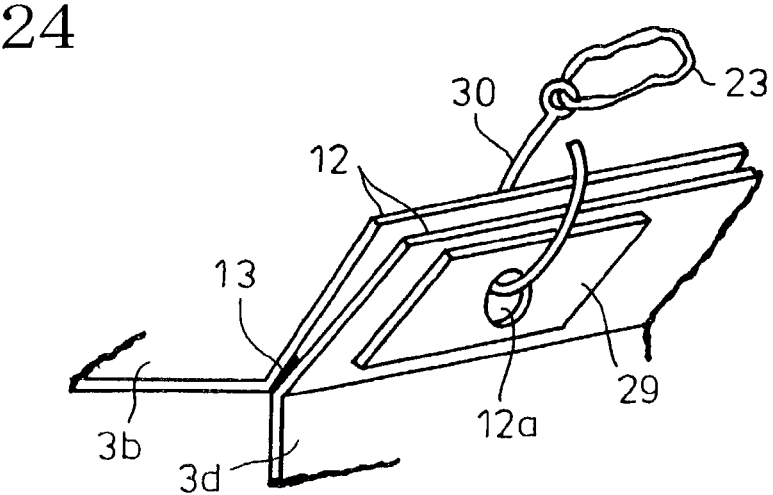
FIG. 24 is a perspective view showing a still further modification of the supported means attached to the fins.

A further alternative of the supported means to be fitted over the fins 12 may comprise a reinforcement member 29 fixed between the adjacent fins 12 or to one surface of them as is shown in FIG. 24 such that an opening 12a extends through the fins 12 and reinforcement member 29 to be engaged with a hook-shaped supported member 30 which in turn is engaged with the rubber string 23. In the case of the supported means shown in FIG. 24, the envelope 3 can be readily mounted on the frame body 2 by hooking the rubber strings 23 on the hooks 22 as shown in FIG. 21.

Figure 25:
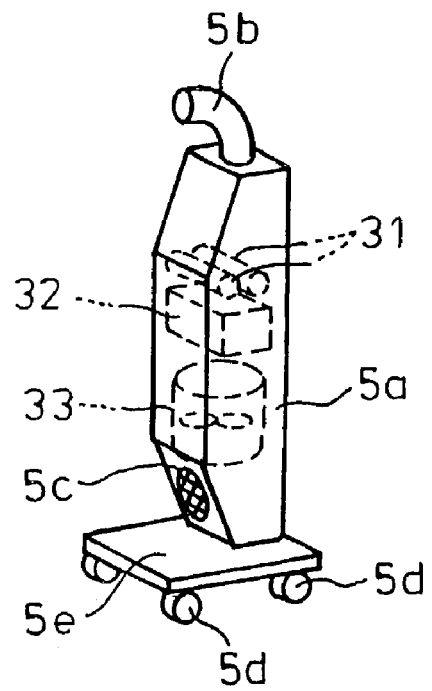
FIG. 25 is a perspective view of an exhauster employed in the patient isolation unit shown in FIG. 1.

As shown in FIG. 25, the exhauster 5 comprises a casing 5a with an exhaust duct 5b connected to a top of the casing and with an exhaust port 5c formed on a bottom of the casing. The casing 5a is mounted on a carriage 5e with caster-type wheels 5d. Within the casing 5a, a UV lamp 31 for sterilization, an HEPA filter 32 and a blower 33 are installed in the order named from the top to the bottom, i.e., from upstream to downstream of air flow. The casing 5a and the exhaust duct 5b are made of stainless steel.

Figure 26:
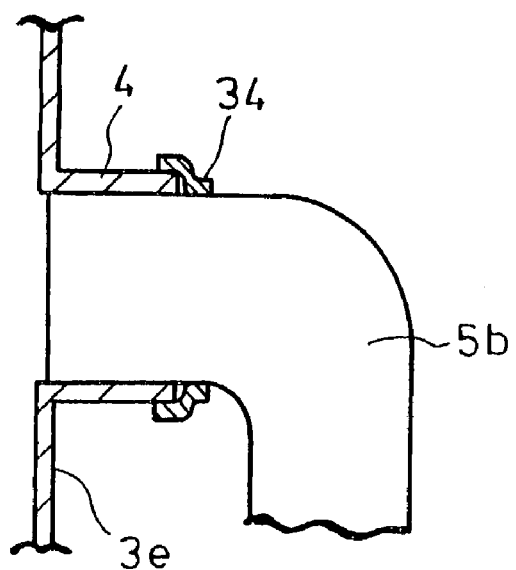
FIG. 26 is an enlarged fragmentary side sectional view showing a state in which an exhaust duct of the envelope is connected to an exhaust duct of the exhauster.

When the patient isolation unit 1 is to be used, the exhaust duct 4 of the envelope 3 is fitted over and connected to the exhaust duct 5b of the exhauster 5 as shown in FIG. 26. In this case, tape 34 may be wound around a connection between the exhaust ducts 4 and 5b against air leakage.

Thus, germs and bacteria in the air sucked from the envelope 3 through the exhaust ducts 4 and 5b to the exhauster 5 by driving the blower 33 are partly captured by the HEPA filter 32 and partly stick to inner surfaces of the exhaust duct 5b and casing 5a upstream of the HEPA filter 32. The germs and bacteria thus captured and sticking are sterilized by UV rays radiated from the UV lamp 31 and those reflected by the inner surfaces of the casing 5a and exhaust duct 5b. The air thus sterilized and cleaned up is discharged from the discharge port 5c on the bottom of the casing 5a.

The exhaust duct 5b made of, for example, stainless steel has a mirror-finished inner surface so that UV rays radiated from the UV lamp 31 are equally reflected. The open end of the exhaust duct 5b may be covered with a cap so that germs and bacteria sticking to the inside of the exhaust duct 5b do not scatter to the outside after use of the patient isolation unit.

The mode of operation of the above embodiment will be described.

When the patient isolation unit 1 is to be used, the frame body 2, the envelope 3, the exhauster 5 and other necessary assembly parts are transported to a location for use from a storage site which is not required to be a larger space because of the frame body 2 and the envelope 3 being folded and the exhauster 5 being compact in size. Such transportation of the envelope 3, the frame body 2 and the exhauster 5 to the location for use can be effected readily since the envelope 3 is not particularly heavy, the frame body 2 has wheels 7 on the bottoms of the folded pillars 2a and the exhauster 5 has the wheels 5d under the carriage 5e.

In assembling the frame body 2 at the location for use of the patient isolation unit 1, the beam members 2c are unfolded upwardly into an approximately horizontal position about the hinges 8 and 9 so as to be perpendicular to the pillars 2a and the pillars 2a are unfolded about the hinges 6 into an approximately vertical position. Then, fold-preventive means are mounted on the pillars 2a at their junctions and the fastening means 10 are tightened to fix the brace members 2f to the pillars 2a.

The envelope 3, folded as shown in FIG. 17, is unfolded and set in the frame body 2, with the position of the hooks 22 being adjusted and fixed. For example, when the clips 24 shown in FIG. 21 are used, the supported members 20 attached to the fins 12 at the connections between the portions of the envelope 3 are pinched by the clips 24 which in turn are hooked on the hooks 22 via the rubber strings 23 so that the envelope 3 is hung from or horizontally fixedly supported by the frame body 2. The envelope 3 thus unfolded provides enough space for treatment.

In the case of the supported members 25 or 27 shown in FIG. 22 or 23 being used, the strings 26 or 28 are engaged to the hooks 22. In the case of the supported member 30 shown in FIG. 24 being used, the rubber strings 23 extending through the supported members 30 are engaged to the hooks 22.

As shown in FIG. 26, the exhaust duct 4 of the envelope 3 is fixedly fitted over the exhaust duct 5b of the exhauster 5 and the tape 34 is wound around the connections between the exhaust ducts 4 and 5b for fixation and prevention of air leakage. Necessary treatment-ware and fittings such as a bed are generally brought into the envelope 3 from the access port 14.

When a bed or other fittings cannot be brought into the envelope 3 through the access port 14 because of being too large, the bed is arranged within the assembled frame body 2 and then the envelope 3 is unfolded from above as shown in FIG. 18 so as to bring the bed into the envelope 3 through the opening 3a' of the bottom portion 3a.

Figure 14:
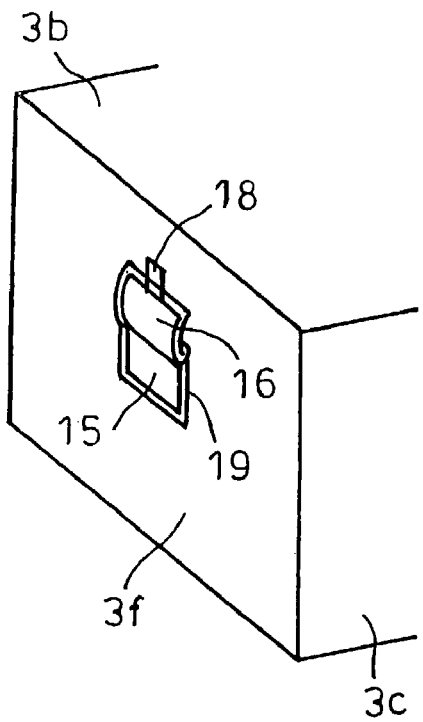
FIG. 14 is a perspective view of the envelope shown in FIG. 10 with an outer cover being lifted to open.
Figure 15:
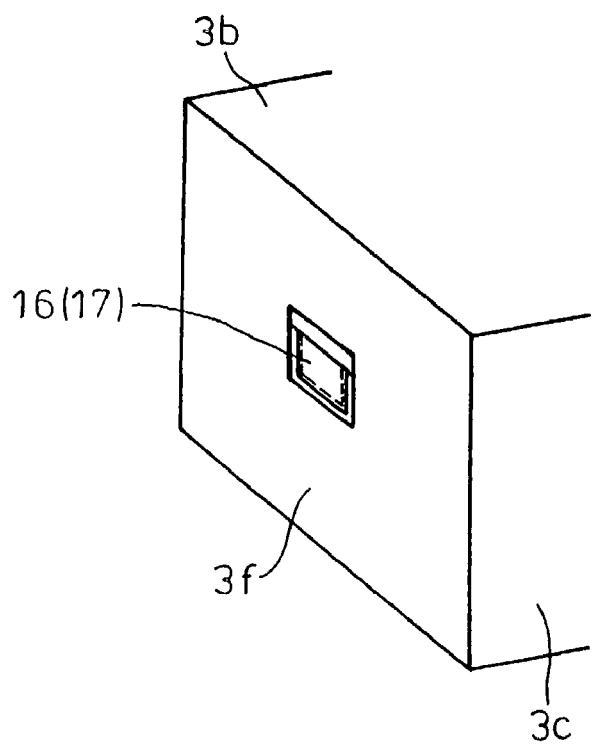
FIG. 15 is a perspective view of the envelope shown in FIG. 10 with the outer cover being closed.

When a patient isolated in the envelope 3 is to be treated, the outer cover 16 is lifted to an open position as shown in FIG. 14 and the blower 33 of the exhauster 5 is driven. Air is allowed to flow from the intake 15 through gaps around the inner cover 17 into the envelope 3 and is discharged to the exhaust duct 4 of the envelope 3 and via the exhaust duct 5b of the exhauster 5 into the casing 5a. Germs and bacteria entrained in the air flowing into the casing 5a are partly captured by the HEPA filter 32 and partly stick to the inner surfaces of the exhaust duct 5b and casing 5a upstream of the HEPA filter 32.

The germs and bacteria thus captured and sticking are sterilized by UV rays radiated from the UV lamp 31 and those reflected by the inner surfaces of the exhaust duct 5b and casing 5a. The air cleaned up after passing through the HEPA filter 32 is discharged from the discharge port 5c by the blower 33. Therefore, there is no fear of germs and bacteria being contained in the air discharged from the envelope 3.

Since the air in the envelope 3 is sucked and discharged by the blower 33, the inside of the envelope 3 is kept under negative pressure so that there is no fear that the air inside the envelope 3 leaks out. The number of ventilation operations in the envelope 3 by the blower 33 may be, for example, about 12 times per hour.

Upon treatment of a patient, germs and bacteria are killed by the exhauster 5 with no fear of being discharged outside, which means that contagious diseases cannot infect outside the envelope 3. Thus, a patient with an infectious disease can be treated in a safe environment to the outside of the unit, resulting in prevention of in-hospital infection.

After the treatment is completed, the patient isolation unit 1 is disassembled and removed. The process in this case will be described in conjunction with FIGS. 27 to 31.

Figure 27:
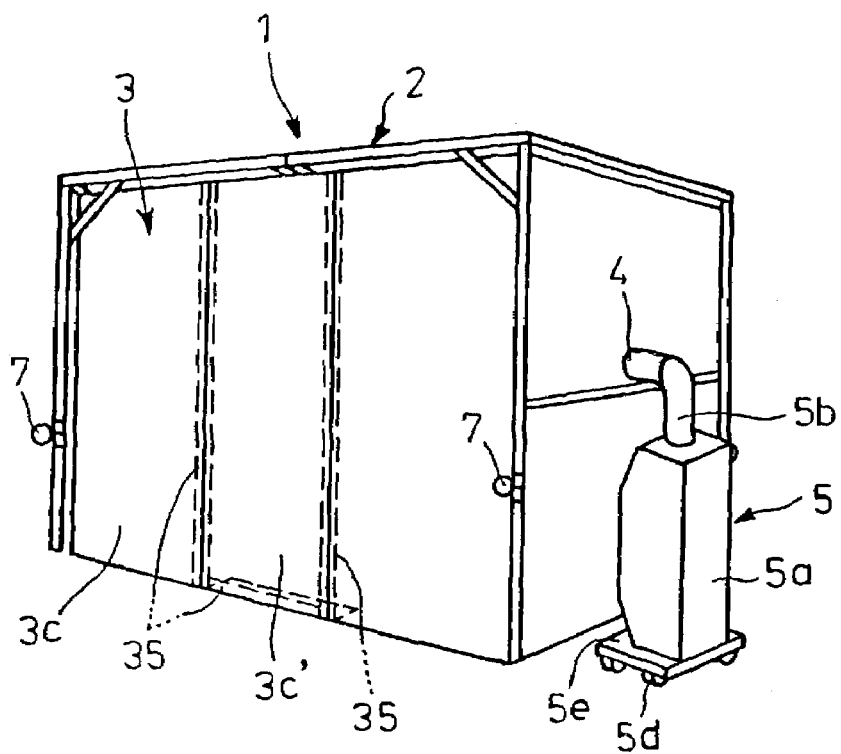

When the patient isolation unit 1 is to be disassembled and removed, the bed and other fittings inside the envelope 3 are removed with the blower 33 of the exhauster 5 being driven. The outer cover 16 is closed as shown in FIG. 16 and adhesively attached to the double-sided adhesive tape 19 fixed along the lower and opposite side edges of the air intake 15 on the outer side of the rear wall portion 3f to seal the air intake 15. Similarly, as shown in FIG. 27, the lower and opposite side edges on an inner surface of the curtain 3c' are attached to the wall and bottom portions 3c and 3a of the envelope 3 by double-sided adhesive tape 35 to seal the access port 14.

Figure 28:
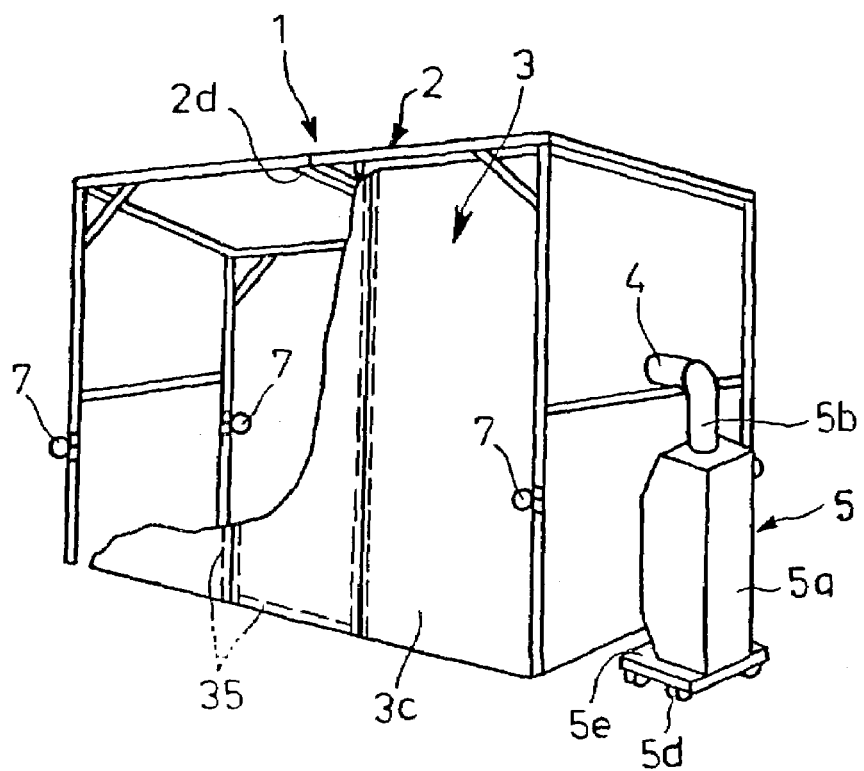
Figure 29:
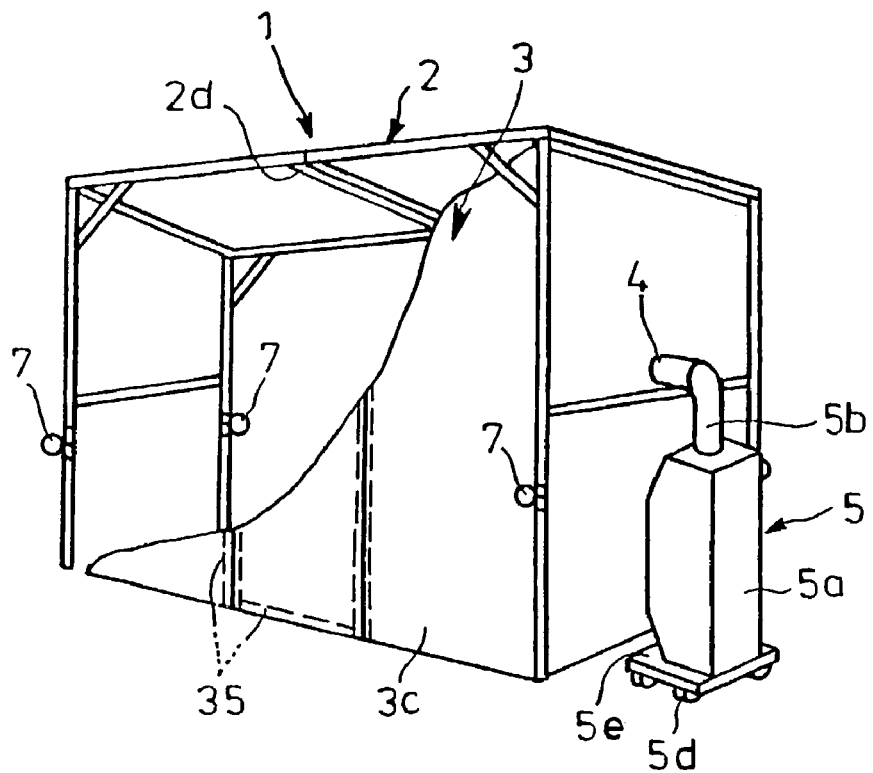

Subsequently, some of the clips 24 on the side away from the exhauster 5 are detached from the supported member 20 attached to the fins 12 of the envelope 3. Then, as shown in FIG. 28, the side of the envelope 3 away from the exhauster 5 is removed from the frame body 2. Since the blower 33 of the exhauster 5 is in operation, the air inside the envelope 3 is discharged to flatten the envelope. With the envelope 3 being flattened to some degree, some of the pinching clips 24 are further detached from the supported member 20 attached to the fins 12 of the envelope 3 on the side away from the exhauster 5. This procedure is repeated from the side away from the exhauster 5 toward the exhauster 5 (see FIG. 29).

Figure 30:
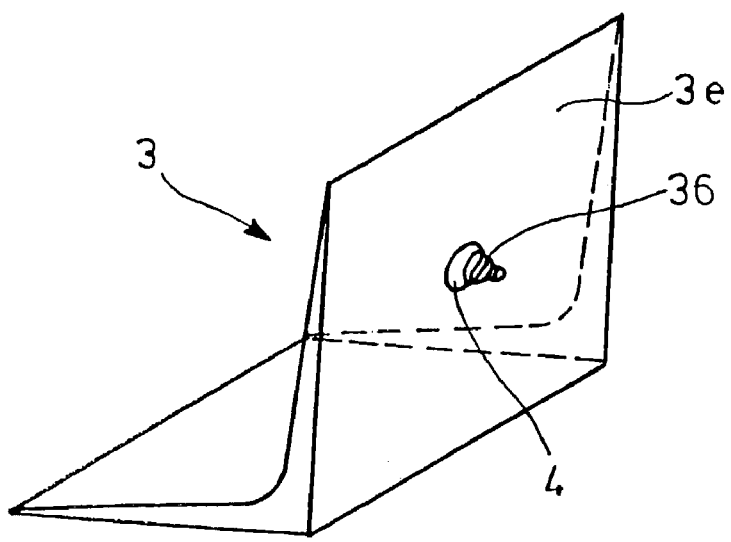

Therefore, the envelope 3 is flattened more and more due to evacuation by the blower 33. When only the front wall portion 3e of the envelope 3 is left to be hung as shown in FIG. 30, the exhaust duct 5b is detached from the exhaust duct 4 and tape 36 is wound fixedly around the exhaust duct 4 to throttle and seal the same. The opening of the exhaust duct 5b is capped and the blower 33 of the exhauster 5 is stopped.

With all of the clips 24 being detached, the envelope 3 drops on the floor into an substantially flat shape. Operators then fold the substantially flat envelope 3 into a round mass as shown in FIG. 31.

In the case of evacuation of the envelope 3 having the bottom portion 3a with the opening 3a' as shown in FIG. 18, the outer cover 16 (see FIG. 16) and the curtain 3c' (see FIG. 27) at the access port 14 are sealed without the opening 3a' being sealed. Then, in this state, the bed is removed through the opening 3a' and the envelope 3 is evacuated by the exhauster 5. Since the bottom portion 3a is in contact with an underlying floor, evacuation is performed properly without the opening 3a' of the bottom portion 3a being sealed.

Figure 4:
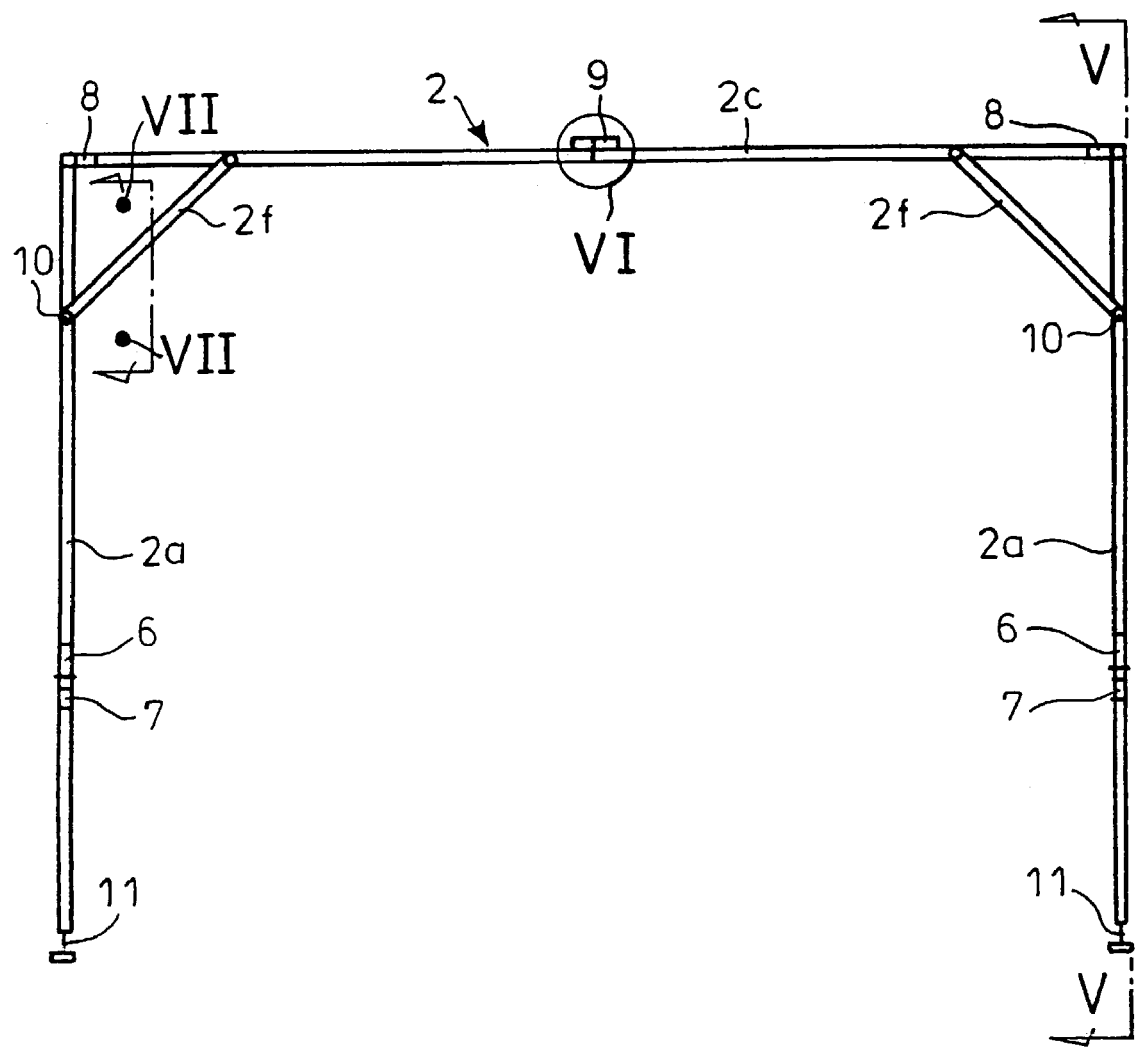
FIG. 4 is an enlarged side view of the frame body shown in FIG. 2.
Figure 5:
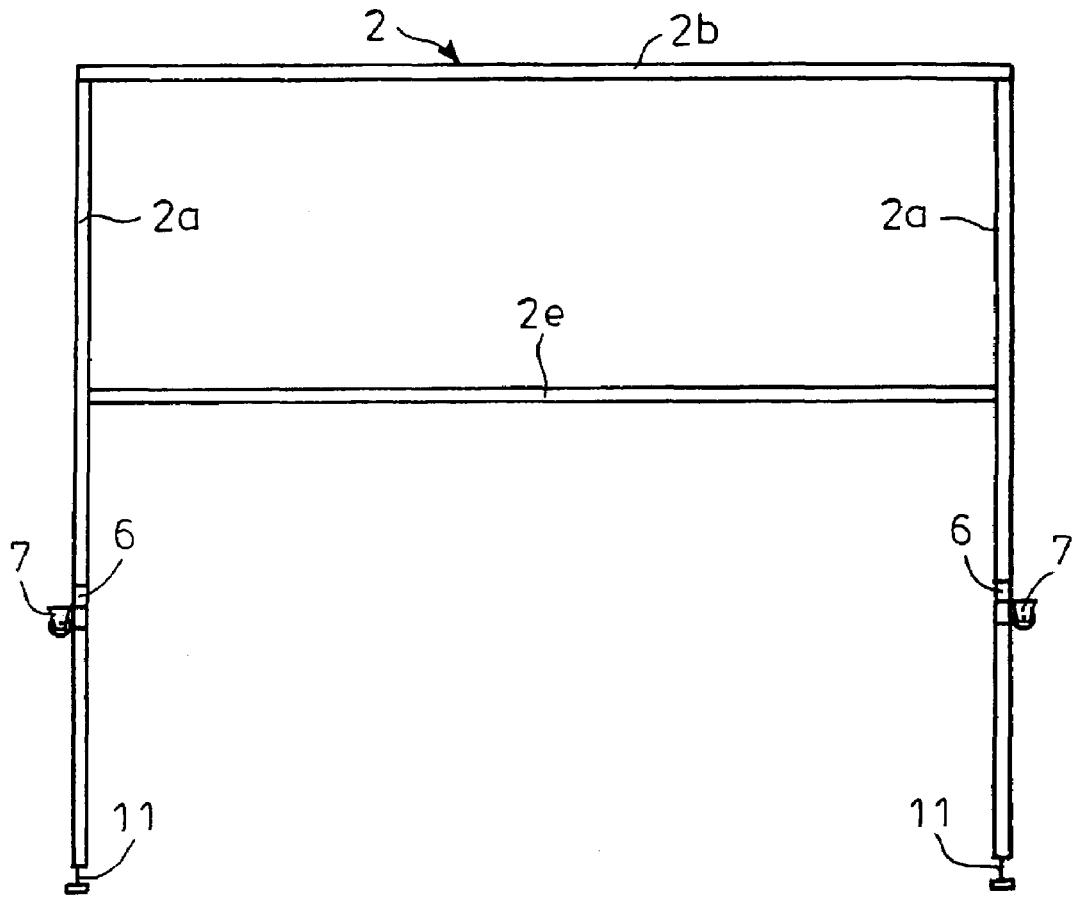
FIG. 5 is a view looking in the direction of arrows V in FIG. 4.
Figure 6:
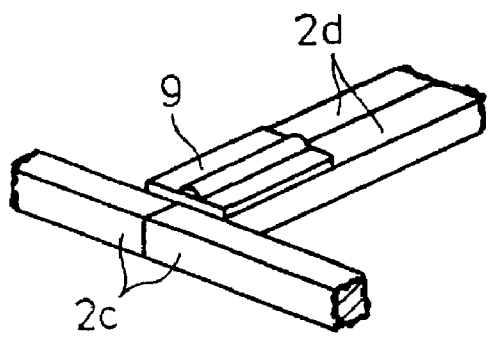
FIG. 6 is an enlarged perspective view of a portion VI in FIG. 4.
Figure 31:
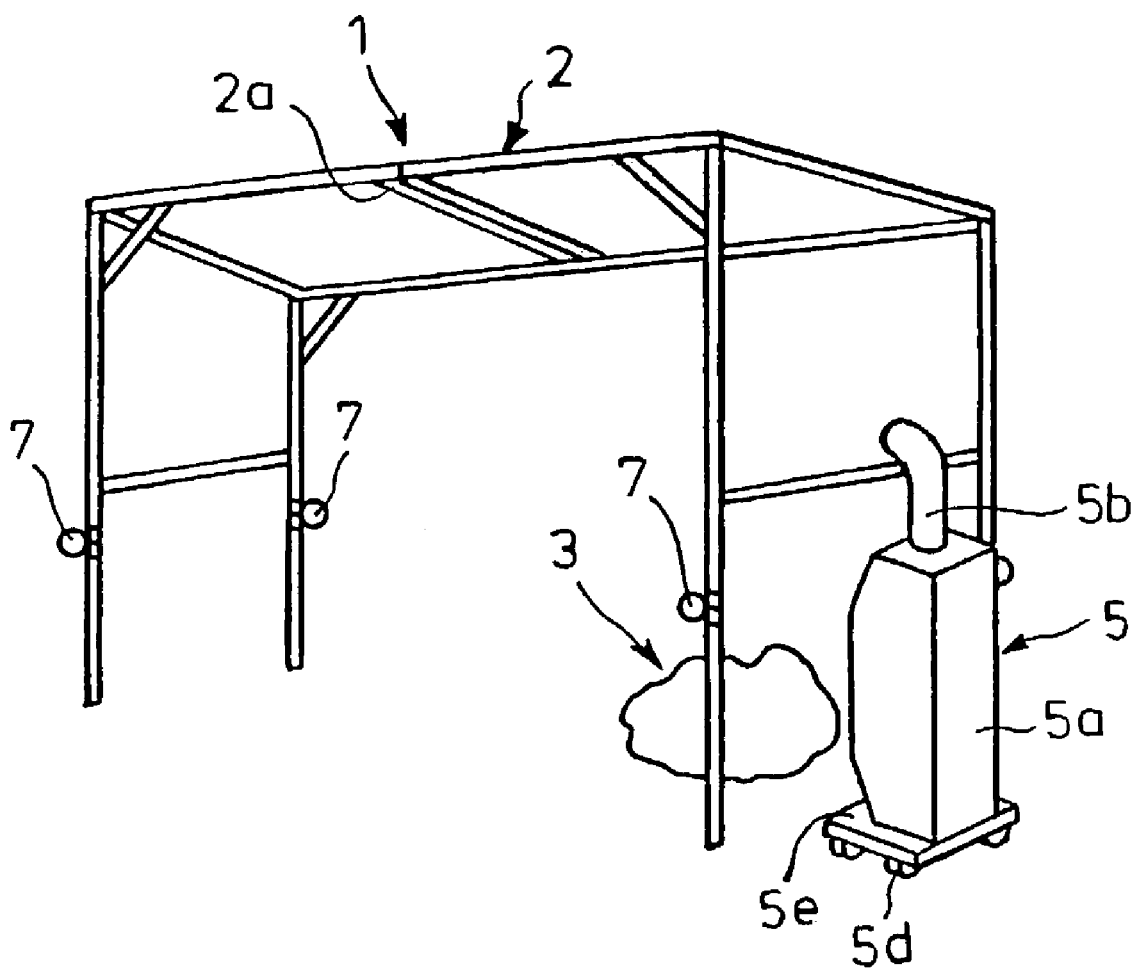

Subsequently, the fold-preventive means attached to the foldable portions of the upright pillars 2a in the frame body 2 as shown in FIGS. 2, 4 and 31 are detached and the fastening means 10 (see FIG. 7) fastening the connections of the brace members 2f to the pillars 2a are loosened. Then, the pillars 2a are folded up about the hinges 6 so that the lower portions of the pillars 2a are positioned inside the upper portions of the pillars 2a. The beam members 2c are folded down about the hinges 8 and 9 so as to be positioned inside the upper portions of the pillars 2a (see FIGS. 3, 8, and 9).

The envelope 3 evacuated and folded is incinerated and the folded frame body 2 and the exhauster 5 are transported to a storage site and stored there. The HEPA filter 32 as filter means in the exhauster 5 does not need to be discarded every time the envelope 3 is incinerated. Therefore, the HEPA filter 32 lasts for a longer period of time so as to reduce the cost.

The frame body 2 and the exhauster 5 can be readily transported since they are provided with wheels 7 and 5d, respectively. They do not occupy a large space for storage since the folded frame body 2 and the exhauster 5 are small in size. Furthermore, exchange of the HEPA filter 32 which must be effected regularly can be carried out safely since there is no fear of an operation being infected in the filter exchange operation. The operation of assembling/disassembling the isolation unit may typically require about 30 minutes and two workers.

FIGS. 32 to 47 show a modification of the frame body which is used for a patient isolation unit according to the present invention. A frame body 41, which corresponds to the frame body 2 mentioned above, comprises pillars 41a; paired longitudinal beam members 41b and 41c connected at their opposite ends to upper ends of the pillars 41a through sleeve members 49 as will be described so as to interconnect those pillars 41a; paired lateral beam members 41d and 41e connected at their opposite ends to the upper ends of the pillars 41a through the sleeve members 49; lateral beam members 41f connected at their opposite ends to midpoints in height of the pillars 41a so as to interconnect those pillars 41a; and a lateral beam member 41g connected at its opposite ends to midpoints in length of the beam members 41b in parallel with the beam members 41d and 41e.

Each of the pillars 41a comprises upper and lower portions hinged together by a hinge 43 so as to be foldable about the hinge 43. The upper portion of the pillar 41a has a caster-type wheel 44 at its lower end. Height adjusting means 42 may be provided on a lower end of each of the pillars 41a.

Figure 34:
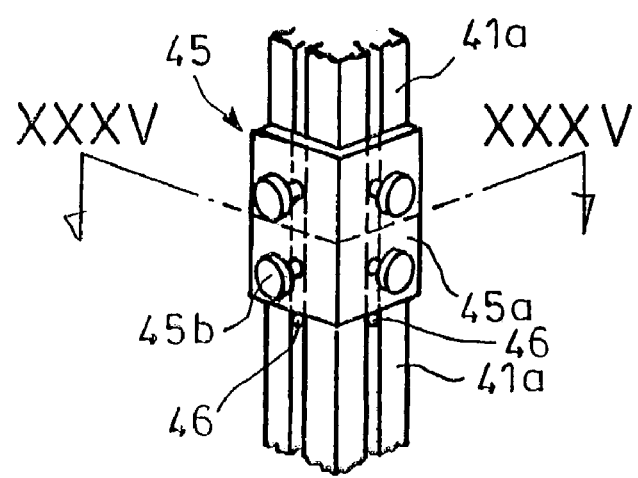
FIG. 34 is a perspective view of fold-preventive means attached to joint portions of the pillar in the frame body shown in FIG. 32.
Figure 35:
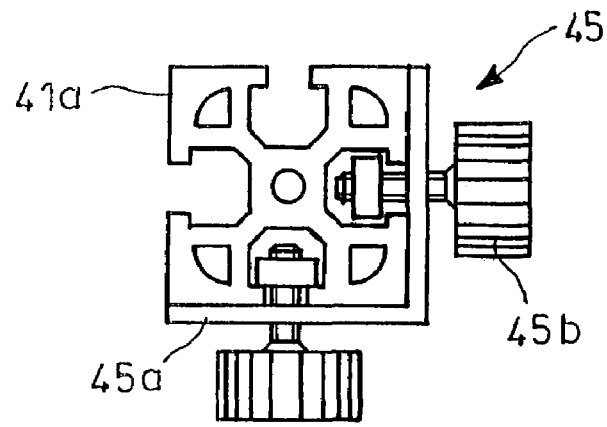
FIG. 35 is a sectional view taken along line XXXV—XXXV in FIG. 34.

Each of the pillars 41a has fold-preventive means 45 at junctions or connections between its upper and lower portions. The fold-preventive means comprises, as shown in FIGS. 34 and 35, an angle-shaped jig 45a abutting on two outer surfaces of each of the upper and lower portions of the pillar 41a and fastening means 45b in the form of knobbed bolts and nuts to fix the jig 45a to the pillar 41a.

When the frame body 41 is assembled, lower ends of the fold-preventive-means 45 abut on stoppers 46 attached to the lower portions of the pillars 41a. Upon folding of the frame body 45, the fastening means 45b are loosened and the fold-preventive means 45 are raised along the pillars 41a into positions higher than the junctions or connections between the pillar porions. The stopper 46 serves to easily and quickly set the fold-preventive means 45 at each joint position between the upper and lower portions of the pillar 41a when the pillars 41a are erected in assembling the frame body 41.

Figure 40:
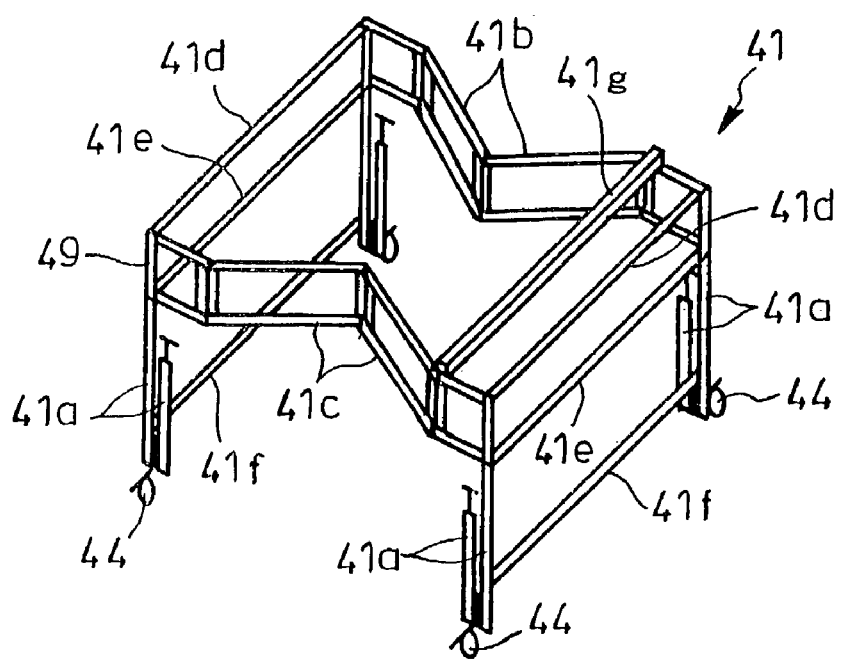

The longitudinal beam members 41b and 41c are hinged by hinges 47 at positions adjacent to the upper ends of the pillars 41a and hinged by hinges 48 at midpoints in length of the members 41b and 41c so that the beam members 41b and 41c are foldable horizontally to be positioned between the beam member pairs 41d and 41e (see FIG. 40).

Figure 33:
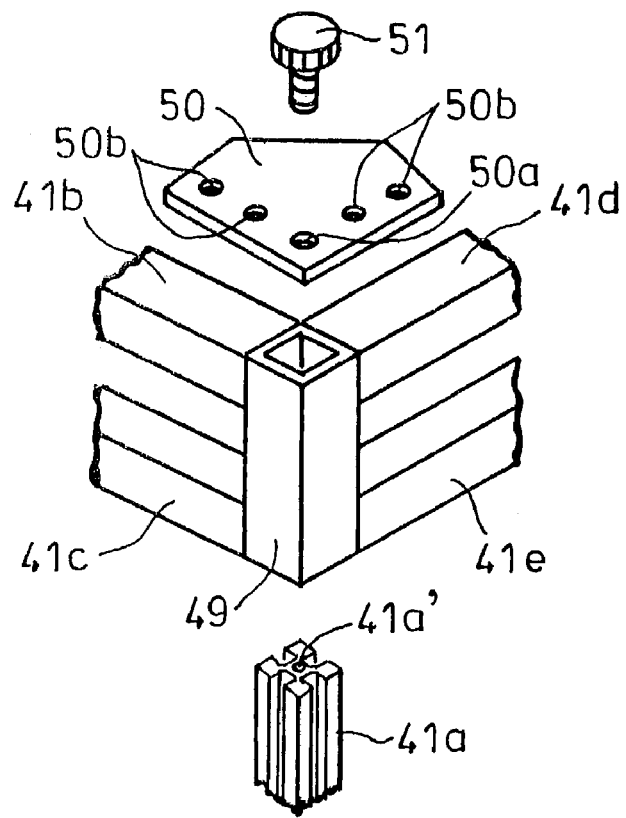
FIG. 33 is an exploded fragmentary perspective view of an upper end of the pillar and members attached thereto in the frame body shown in FIG. 32.

As shown in FIG. 33, ends of the beam members 41b, 41c, 41d and 41e are integrally fixed to the sleeve members 49. The sleeve members 49 thus integrally having the fixed beam members 41b, 41c, 41d and 41e are fitted over the upper ends of the pillars 41a.

A corner plate 50 with bolt holes 50a and 50b is mounted on the upper end of the sleeve member 49, fitted over the upper end of the pillar 41a and is fixed to the beam members 41b and 41d by screwing bolts (not shown) via the bolt holes 50b into the members 41b and 41d. The cover plate 50 is fixed to the pillar 41a by screwing a knobbed bolt 51 via the bolt hole 50a into a threaded hole 41a' on the pillar 41a.

Figure 32:
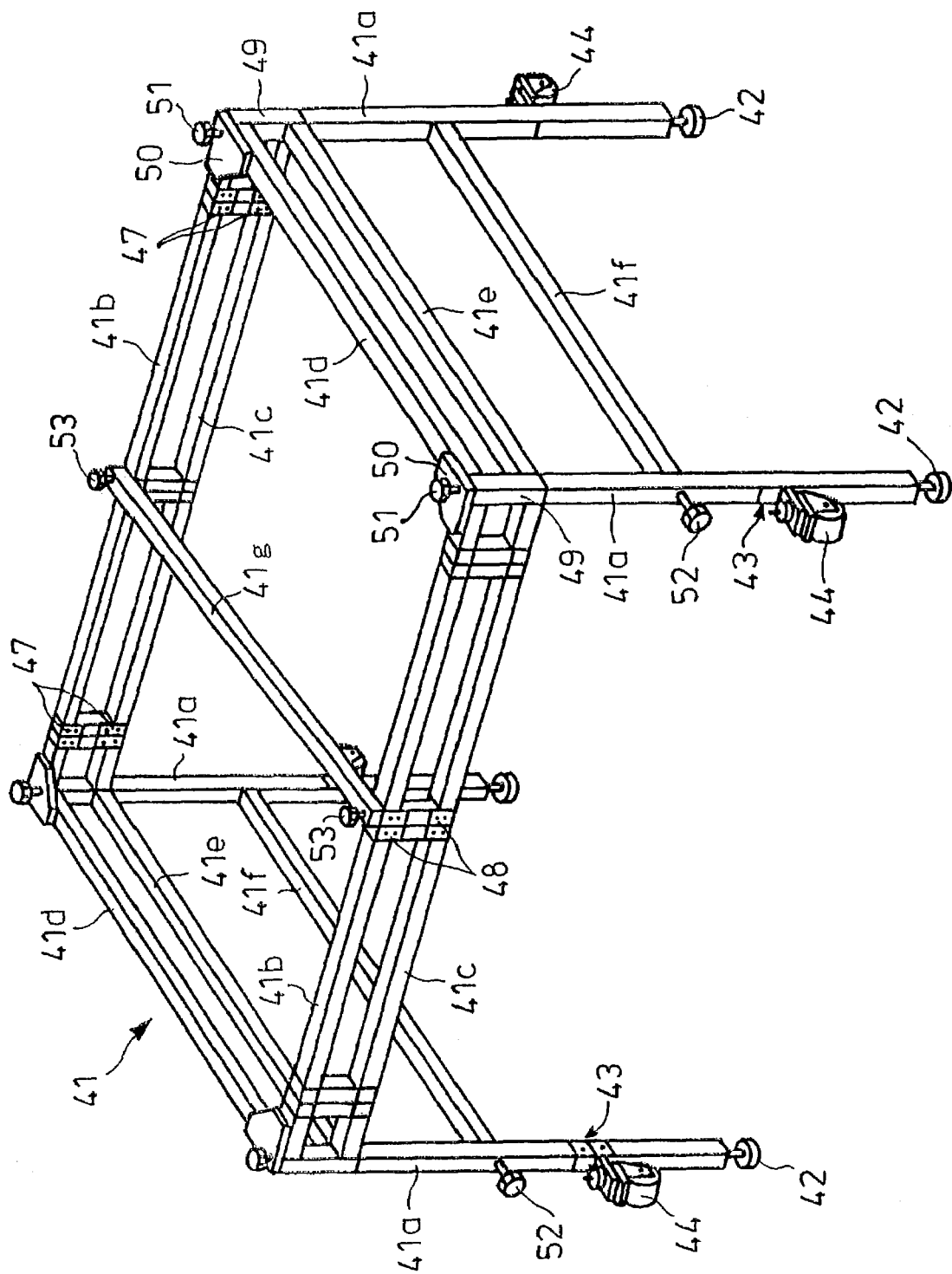
FIG. 32 is a perspective view of a modification of the frame body employed in the patient isolation unit according to the present invention.

In FIG. 32, reference numeral 52 represents a knobbed bolt to connect the beam member 41f to the pillar 41a at a position above the junction; and 53, a knobbed bolt to connect the beam member 41g to the beam member 41b.

The frame body 41 is assembled from its folded and disassembled state in use and is folded and disassembled after use. A procedure of folding and disassembling the frame body will be described. Explanation on a procedure of assembling the frame body is omitted since it is reverse to that of folding and disassembling the frame body.

Figure 36:
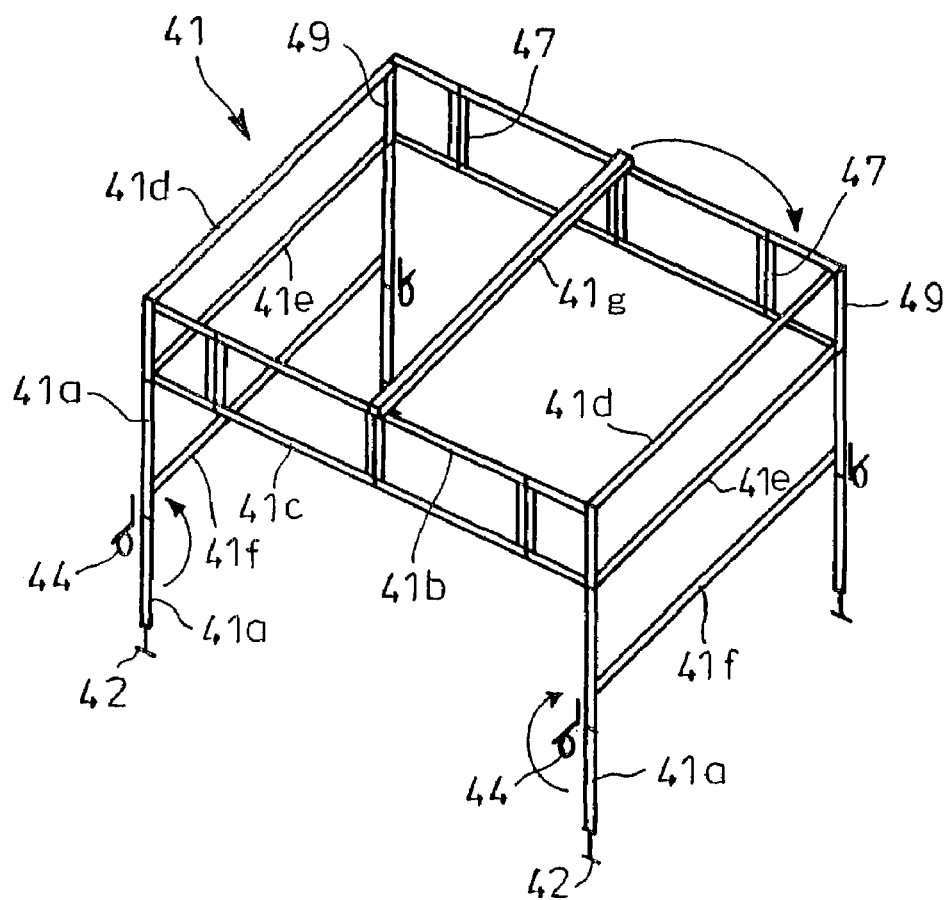

When the assembled frame body 41 as shown in FIGS. 32 and 36 is to be folded and disassembled, the fastening means 45b of the fold-preventive means 45 attached at each joint of the upper and lower portions of the pillars 41a (see FIGS. 34 and 35) is loosened. Then, each of the fold-preventive means 45 with its jig 45a in abutment against the stopper 46 is raised, together with the fastening means 45b, to a position on the upper portion of the pillar 41a where the joint between the upper and lower portions is revealed, and the fastening means 45b is tightened.

Figure 37:
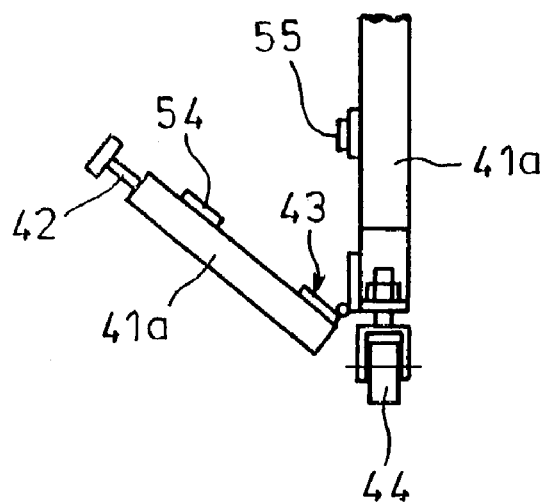
Figure 38:
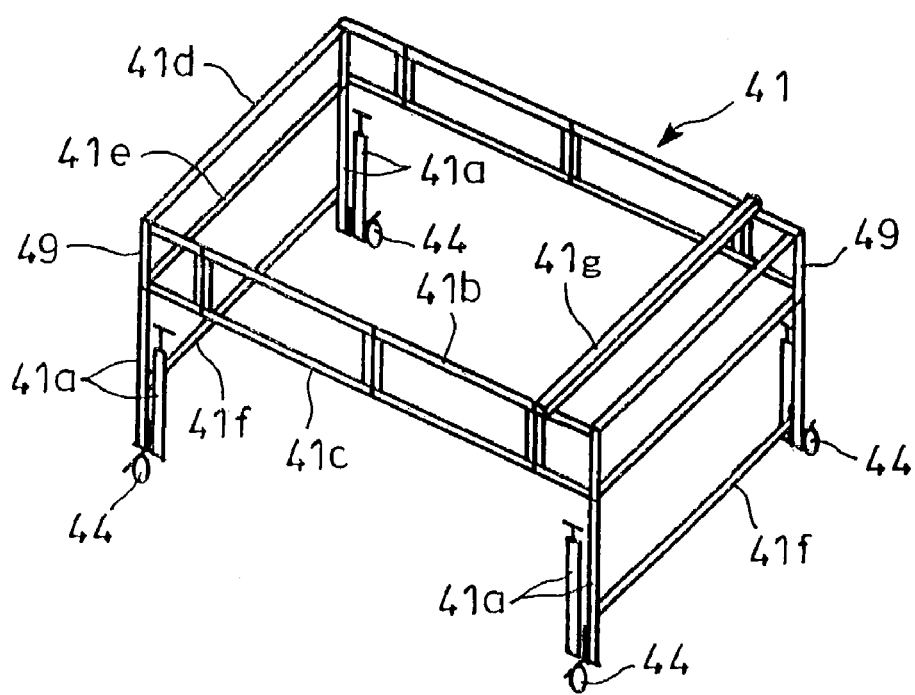
Figure 39:
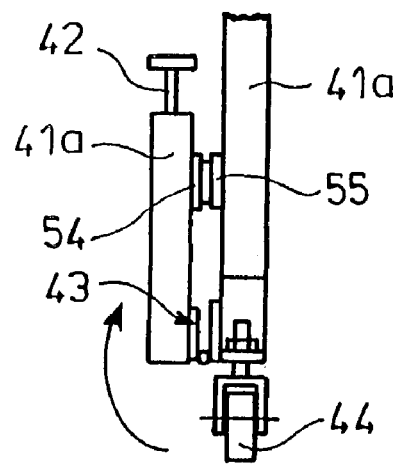

Subsequently, as shown in FIGS. 37 and 38, each pillar 41a is so folded into two about the hinge 43 that the lower portion thereof is positioned inside of the upper portion of the pillar 41a while a steel plate 54 attached to the lower portion of the pillar 41a is attracted onto a magnet 55 attached to the upper portion of the pillar 41a. In this way, the pillar 41a is fixedly folded so as not to open as shown in FIG. 39.

With the bolts 53 as shown in FIG. 32 being loosened, the beam member 41g is moved along the beam members 41b to one end thereof and then the bolts 53 are tightened to fix the beam member 41g for immovability (see FIG. 38). The beam member 41g is similar in sectional shape to the pillar 41a shown in FIG. 35 such that the member 41g with the loosened bolts 53 can be readily slided on the beam members 41b.

Figure 41:
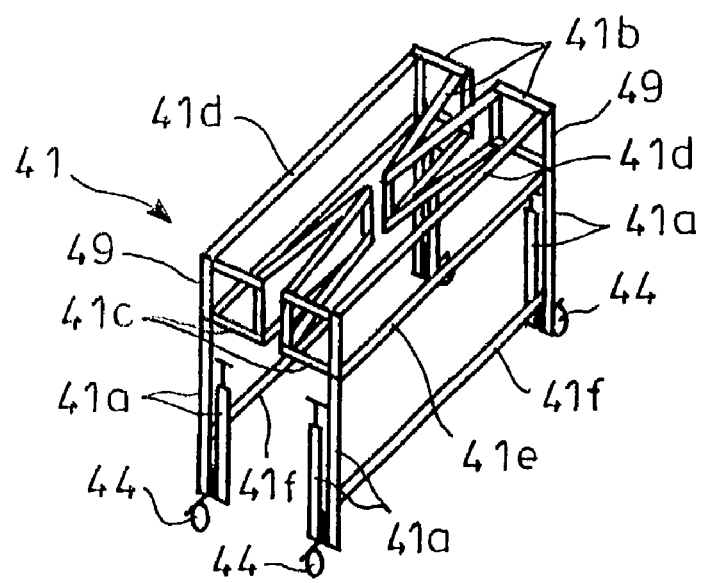
Figure 42:
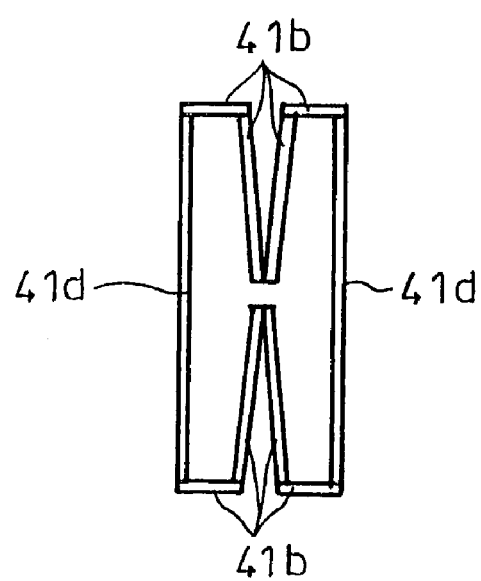
Figure 43:
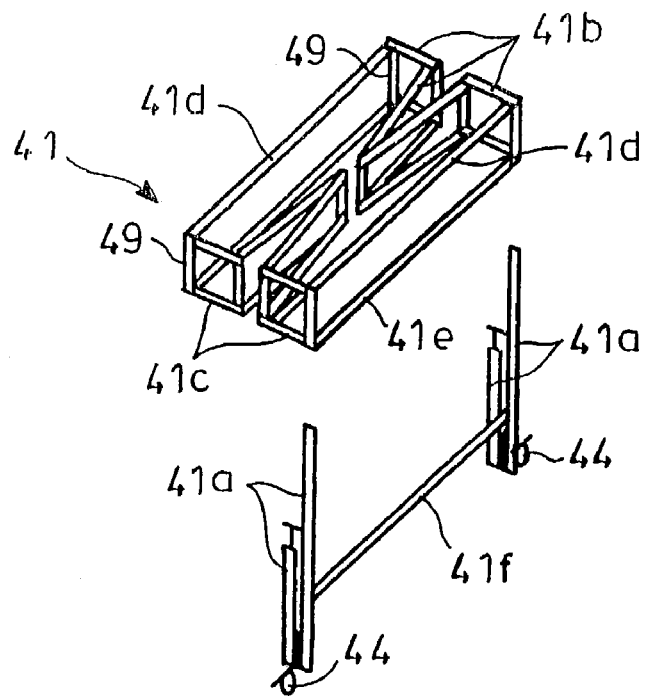
Figure 44:
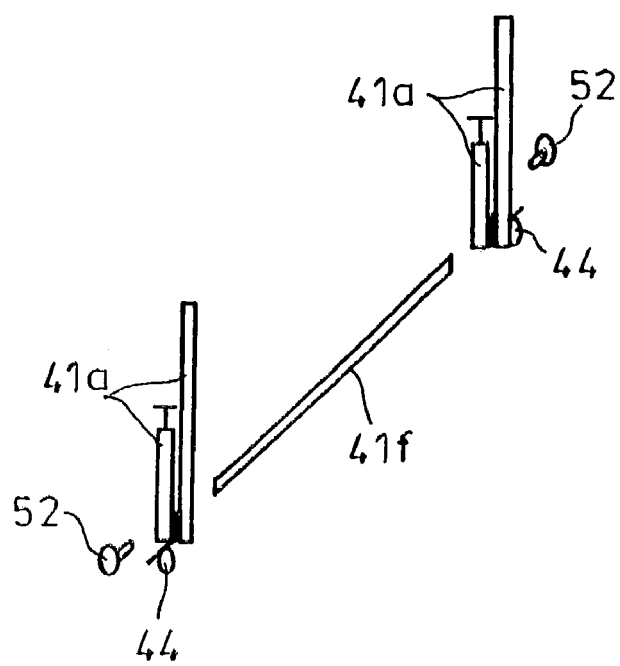
Figure 45:
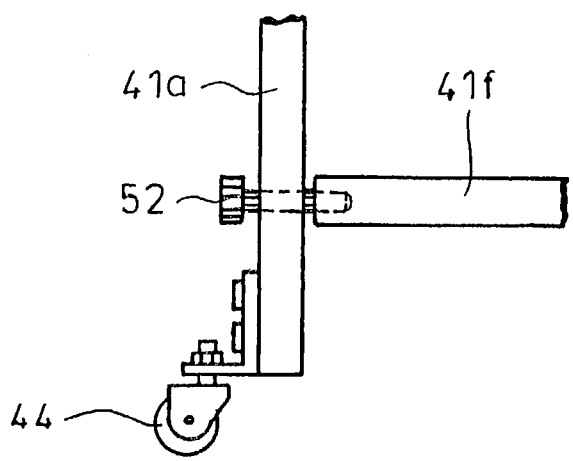
Figure 46:
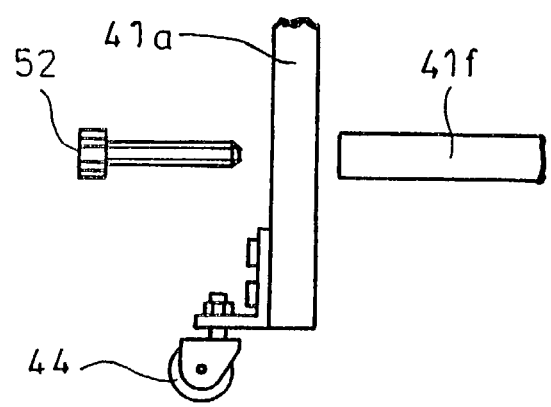
Figure 47:
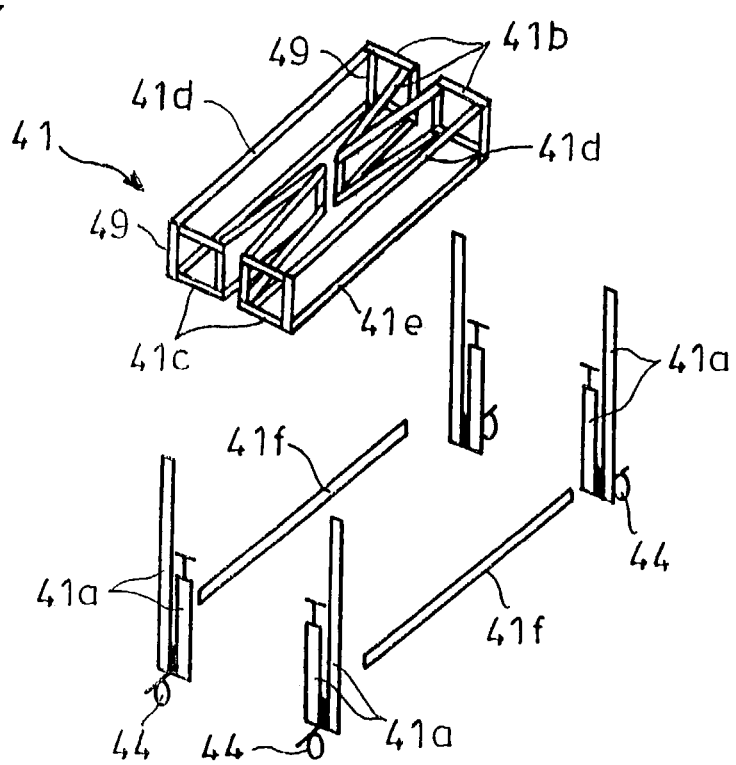

The beam members 41b and 41c are then folded aside horizontally about the hinges 47 and 48 so that the midpoints of the beam members 41b and 41c are positioned between the beam member pairs 41d and 41e (see FIGS. 40 to 42). Then, the bolts 51 shown in FIG. 32 are loosened and the pillars 41a are pulled out from the sleeve members 49 fixed to the beam members 41b, 41c, 41d and 41e, and the beam members 41f are detached from the pillars 41a by unscrewing the bolts 52 (see FIGS. 45 and 46). In this way, the frame body 41 is disassembled into seven sets of parts as shown in FIG. 47.

Although the folded portions of the beam members 41b are shown in V-shape in FIGS. 41, 42, 43 and 47, those portions are practically at right angles to the unfolded portions and in parallel with each other.

When the frame body 41 is to be transported from a location for use to a storage site or vice versa, the frame body 41 is preferably moved by the help of the wheels 44 with the parts folded but not entirely disassembled, as shown in FIG. 41.

More specifically, folding the frame body 41 as shown in FIG. 41 enables the wheels 44 to stand on a floor so that the frame body 41 can be transported easily. In addition, no larger space is required for storing the frame body; particularly, if the frame body is disassembled as shown in FIG. 47, a further smaller space for storage will suffice.

It is to be understood that the patient isolation unit according to the present invention is not limited to the embodiments described above and that various changes and modifications may be made without departing from the spirit and scope of the present invention. For example, the envelope may not have fins.

As is clear from the foregoing, a patient isolation unit according to the present invention provides the following and other advantages.

I) Germs and bacteria entrained in the air from the envelope are captured by the filter means and killed and those sticking to the inner surface of the exhauster upstream of the filter means are also killed. These prevent germs and bacteria from being discharged from the exhauster. Furthermore, the inside of the envelope is kept under negative pressure so that germs and bacteria do not leak out therefrom.

II) Therefore, a patient with a contagious disease is treated in a safe environment to the outside of the unit. Filter means can be exchanged safely with no fear of an operator being infected.

III) Since germs and bacteria sticking to the filter means in the exhauster can be killed, the filter means does not need to be discarded every time a spent envelope is incinerated. Therefore, the filter means is economical so as to last for a longer period of time.

IV) The frame body is foldable and/or demountable so as to be transported easily and need only a small space for storage. Therefore, management of a frame body is easily and economical.

What is claimed as new and desired to be secured by Letters Patent of the United States is:

1. A patient isolation unit comprising:
   a foldable frame body including foldable pillars;
   a flammable flexible envelope adapted to be detachably attached to the frame body
   an exhauster configured to discharge air from the envelope, the exhauster including:
      a filter member configured to filter the air,
      a sterilizing member configured to kill germs and/or bacteria sticking to an inner surface of the exhauster upstream of the filter member and captured by the filter member, and
      a discharge member configured to discharge the air free from the germs and/or bacteria; and
   wheels arranged on the foldable pillars such that said wheels are positioned vertically intermediately on said pillars when the pillars are unfolded and on a floor when the pillars are folded so as to stand on the floor.

2. The patient isolation unit as claimed in claim 1, wherein the envelope has a bottom.

3. The patient isolation unit as in claim 1, wherein the envelope has a bottom with an opening.

4. The patient isolation unit as claimed in claim 1, wherein said sterilizing member, said filter member and said discharge member of the exhaust unit are arranged in this order along the direction of the air flow discharged.

5. The patient isolation unit as claimed in claim 1, wherein the foldable pillars have a means for bracing.

6. A patient isolation unit comprising:
   a foldable frame body including foldable pillars;
   a flammable flexible envelope adapted to be detachably attached to the frame body;
   exhaust means for exhausting air from the envelope, the exhaust means including,
      filter means for filtering the air,
      sterilizing means for sterilizing the air by killing germs and/or bacteria sticking to an inner surface of the exhaust means upstream of the filter means and captured by the filter means, and
      discharge means for discharging the air free from the germs and/or bacteria; and
   wheels arranged on the foldable pillars such that said wheels are positioned vertically intermediately on said pillars when the pillars are unfolded and on a floor when the pillars are folded so as to stand on the floor.

7. The patient isolation unit as claimed in claim 6, wherein the envelope has a bottom.

8. The patient isolation unit as claimed in claim 6, wherein the envelope has a bottom with an opening.

9. The patient isolation unit as claimed in claim 6, wherein said sterilizing means, said filter means and said discharge means of the exhaust unit are arranged in this order along the direction of the air flow discharged.

10. The patient isolation unit as claimed in claim 6, wherein the foldable pillars have a means for bracing.

* * * * *